United States Patent
Lloyd et al.

(10) Patent No.: US 8,543,645 B1
(45) Date of Patent: Sep. 24, 2013

(54) LIVE EXPERIMENT FRAMEWORK

(71) Applicant: Google Inc., Mountain View, CA (US)

(72) Inventors: Matthew I. Lloyd, Cambridge, MA (US); Douglas H. Beeferman, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/653,195

(22) Filed: Oct. 16, 2012

Related U.S. Application Data

(63) Continuation of application No. 12/829,162, filed on Jul. 1, 2010, now Pat. No. 8,312,137.

(60) Provisional application No. 61/292,016, filed on Jan. 4, 2010.

(51) Int. Cl.
*G06F 15/16* (2006.01)

(52) U.S. Cl.
USPC ............ 709/203; 709/200; 709/224; 717/124

(58) Field of Classification Search
USPC ................. 709/200, 224, 226, 203; 717/124, 717/141
See application file for complete search history.

(56) References Cited

U.S. PATENT DOCUMENTS

| | | | | |
|---|---|---|---|---|
| 7,660,801 B2 * | 2/2010 | Muno et al. | ................ | 707/999.1 |
| 7,714,908 B2 * | 5/2010 | Holmes | ....................... | 348/231.3 |
| 7,730,320 B2 * | 6/2010 | Satou et al. | ................... | 713/181 |
| 7,941,667 B2 * | 5/2011 | Miyazaki et al. | ............. | 713/176 |
| 2003/0004612 A1 * | 1/2003 | Domanico et al. | ............ | 700/265 |
| 2007/0028115 A1 * | 2/2007 | Kober et al. | ..................... | 713/180 |
| 2008/0229284 A1 * | 9/2008 | Castro et al. | .................. | 717/124 |
| 2010/0318969 A1 * | 12/2010 | Petrovicky et al. | ........... | 717/124 |
| 2011/0004867 A1 * | 1/2011 | Holden et al. | ................. | 717/127 |
| 2011/0173643 A1 * | 7/2011 | Nicolson et al. | .............. | 719/328 |

* cited by examiner

*Primary Examiner* — El Hadji Sall
(74) *Attorney, Agent, or Firm* — Fish & Richardson P.C.

(57) ABSTRACT

This disclosure generally relates to assigning and simultaneously running multiple client-side experiments on client devices. A file includes information regarding experiments that are available, including information regarding "layers," which are logical, imaginary containers in which each experiment "resides." Each experiment is associated with one layer. For each experiment, the file includes information regarding a location and size of the experiment within the layer. When the client device takes an action, a software module identifies a value of an identifier associated with the action. Each such identifier is associated with one or more of the layers. The software module can calculate, for each of the associated layers, a location within the layer based on the identifier value. The computer software module can identify, based on the information in the file, each experiment that overlaps with the calculated location within each layer and cause each identified experiment to be activated.

20 Claims, 3 Drawing Sheets

LIVE EXPERIMENT FRAMEWORK

RELATED APPLICATION

This patent application is a continuation of U.S. patent application Ser. No. 12/829,162 filed on Jul. 1, 2010 which claims priority under 35 U.S.C. §119 to U.S. Patent Application No. 61/292,016, entitled, "Live Experiment Framework," filed Jan. 4, 2010. The complete disclosure of each of the foregoing applications is hereby fully incorporated herein by reference.

TECHNICAL FIELD

The present disclosure relates generally to assigning and running experiments in computer systems and, more particularly, to simultaneously running multiple client-side experiments on a large percentage of client devices using layers.

BACKGROUND

Computer networks, such as the Internet, enable transmission and reception of a vast array of information. Service providers, including content publishers and search engines, provide information and software via the computer networks for use by end users. Like all other computer technology, network-based technology is constantly evolving.

To keep up with technology changes, service providers must continuously test and deploy new information and software for end user devices. For example, service providers are currently deploying and testing a variety of different software modules and improvements thereto related to the developing field of speech recognition technology. Oftentimes, it is desirable to test and deploy new information and software parameters in a "live" environment, on a select set of end user devices. With respect to speech recognition technology, such live experiments may include new language or acoustic models, user interface changes, and audio compression changes, for example.

Existing experiment assignment mechanisms are ineffective for assigning multiple experiments to large percentages of user devices.

SUMMARY

In one exemplary embodiment, a computer-implemented method for assigning software experiments to client devices includes identifying a value of a first identifier associated with an action taken by a client device. The first identifier is associated with at least two layers. The software module calculates, for each of the layers associated with the first identifier, a location within the layer based on the identified value of the first identifier. The software module reads a file that includes information regarding a plurality of software experiments available for activation. Each software experiment is associated with one of the layers. The information in the file includes (a) layer identifiers that each identify a respective one of the layers, and (b) for each software experiment, a location and size within its associated layer. Based on the information read in the file, the software module identifies each experiment that overlaps with the calculated location within each of the layers associated with the first identifier. The software module causes each identified software experiment to be activated on the client device.

DETAILED DESCRIPTION OF EXEMPLARY EMBODIMENTS

Overview

The method and system described herein enable assigning and simultaneously running multiple client-side experiments on a large percentage of client devices. A file can include information regarding the experiments that are available. The information can include layer identifiers that each identify a respective layer. A "layer" can be a logical, imaginary container in which each experiment "resides." Each experiment can be associated with one layer (and its corresponding layer identifier). The information in the file can include, for each experiment, a location and size of the experiment within the layer.

When the client device takes an action, a computer software module can identify a value of an installation identifier associated with the action. Each installation identifier can be associated with one or more of the layers. The computer software module can calculate, for each of the layers associated with the installation identifier, a location within the layer based on the installation identifier value. The computer software module can identify, based on the information in the file, each experiment that overlaps with the calculated location within each layer and cause each identified experiment to be activated. Thus, depending on the number of layers associated with the installation identifier, many large experiments may be run on the client device simultaneously in such a way that the co-activation of two experiments can be guaranteed to be independent.

One or more aspects of the invention can comprise a computer program that embodies the functions described and illustrated herein. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. The inventive functionality of the invention will be explained in more detail in the following description, read in conjunction with the figures illustrating the program flow.

Turning now to the drawings, in which like numerals indicate like elements throughout the figures, exemplary embodiments of the invention are described in detail.

System Architecture and Process

Figure 1:
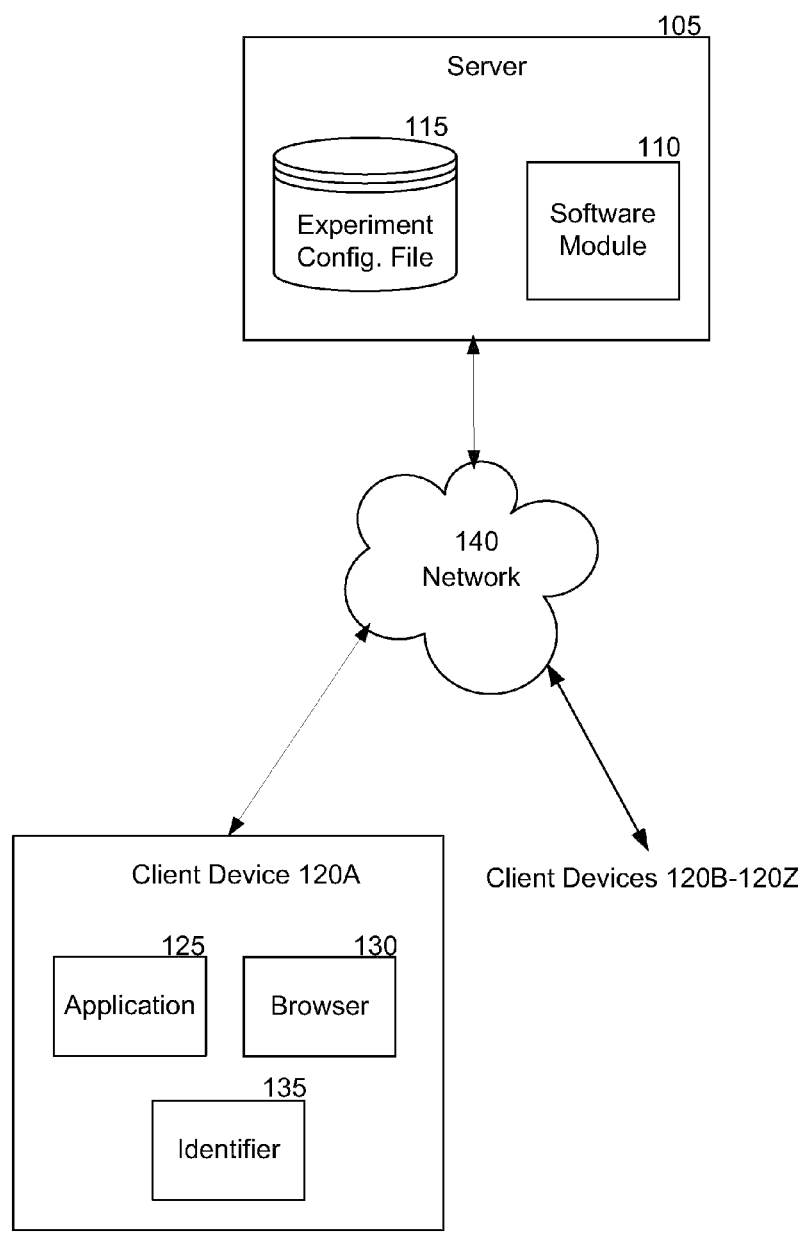
FIG. 1 is a block diagram depicting a system for assigning and simultaneously running multiple client-side experiments on a large percentage of client devices, in accordance with certain exemplary embodiments.
Figure 2:
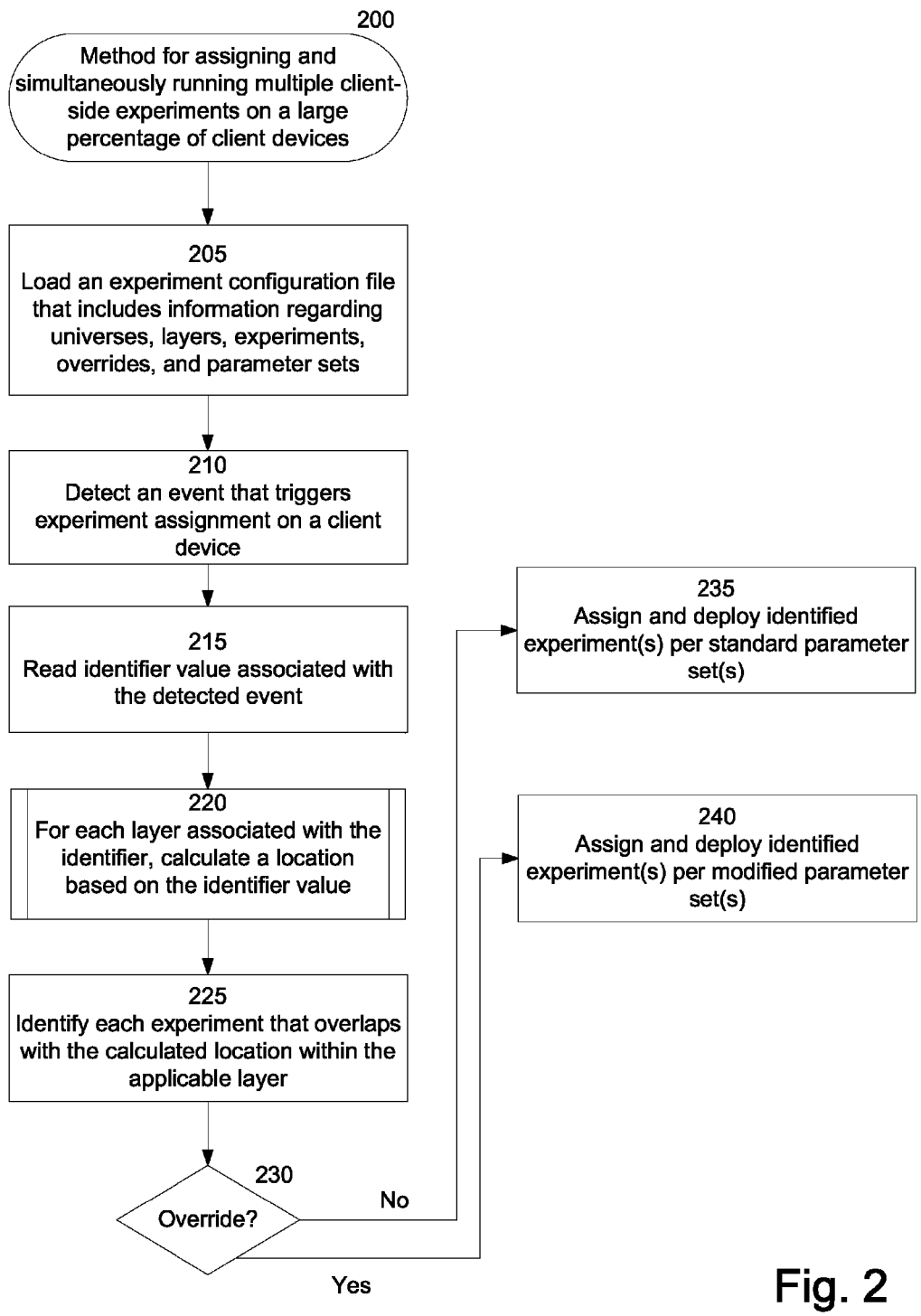
FIG. 2 is a flow chart depicting a method for assigning and simultaneously running multiple client-side experiments on a large percentage of client devices, in accordance with certain exemplary embodiments.

FIG. 1 is a block diagram depicting a system 100 for assigning and simultaneously running multiple client-side experiments on a large percentage of client devices, in accordance with certain exemplary embodiments. FIG. 2 is a block flow diagram depicting a method 200 for assigning and simultaneously running multiple client-side experiments on a large percentage of client devices, in accordance with certain exemplary embodiments. The system 100 is described with reference to the method 200 illustrated in FIG. 2.

In block 205, a software module 110 of a server 105 loads an experiment configuration file 115 that includes information regarding experiments currently running and/or available to run on one or more client devices 120. Each experiment includes a set of software code or parameters for a software configuration that may be tested on the server and/or client device. The client devices and server are interconnected via a network 140. The network 140 includes a wired or wireless telecommunication means by which network devices, including the server 105 and client devices 120, can exchange data. For example, the network 140 can include a local area network ("LAN"), a wide area network ("WAN"), an intranet, an Internet, or any combination thereof. Throughout the discussion of exemplary embodiments, it should be understood that the terms "data" and "information" are used interchangeably herein to refer to text, images, audio, video, or any other form of information that can exist in a computer-based environment.

Each client device 120 includes any device capable of transmitting and receiving data over the network. For example, a client device 120 can be a server, a terminal, a dedicated storage device, a desktop computer, a laptop computer, a wireless network device, such as a personal digital assistant ("PDA"), a handheld computer, a mobile phone, such as an "iPhone," "Blackberry," or other smart phone device, or any other wired or wireless, processor-driven device. Each client device 120 can execute a software application 125 or browser application module 130, such as Google Chrome, Microsoft Internet Explorer, Firefox, Netscape, or another suitable application for interacting with the server and/or other network devices. For example, a custom software application, such as the Google Mobile App for iPhone devices, or an "extension" for a browser application module may be used by the client device to load web page files or other text, graphic, images, sound, video, or other multimedia or data files from the server.

In certain exemplary embodiments, the experiment configuration file 115 identifies each experiment by a constant integer identifier. Each experiment resides in a layer, which in turn resides in a universe. The universe is the space of all possible values of an identifier than can be used to select which experiments are enabled or "active" on certain client devices. For example, a universe can be (a) the set of all possible identifiers for the client device; (b) the set of all possible identifiers for a speech session; or (c) the set of all possible identifiers for an individual utterance. For example, an installation identifier can identify a specific installation of an application on a client device, a session identifier can identify a single invocation of a mobile application that uses speech or a sequence of utterances that comprise a single dictation, and an utterance identifier can identify a sentence that is part of a speech session. In certain exemplary embodiments, a universe can include a browser cookie. Rules for how and where it is determined which experiment identifiers are active, and when those identifiers are recorded for logging purposes, are specific to each universe. But those rules may be entirely deterministic.

For example, an experiment might exist in a layer in an installation-specific identifier. The experiment might be active for 50% of those installation identifiers. When a user installs the application on his client device, there is a 50% chance that the installation identifier assigned to the installation will belong to that experiment. That decision is made deterministically in a repeatable way based on the actual installation identifier assigned; since the installation identifier will never change for that installation, the installation will permanently either belong or not belong to that experiment.

Within each universe, there are one or more layers. In certain exemplary embodiments, the experiment configuration file identifies each layer by a constant integer identifier. Each layer exists within a single universe, and each experiment identifier is associated with only a single layer. As set forth below, the value associated with a universe (such as an installation identifier) is deterministically mapped to a single location within each layer, using a hashing function.

Layers provide the ability to run many large experiments simultaneously, in such a way that the co-activation of two experiments can be guaranteed to be independent. As set forth in the background section above, traditional A-B experiment assignment methodology cannot effectively be used to independently assign several experiments to large percentages of client devices. For example, assigning ten experiments to run on 50% of traffic each would necessarily result in dependence between experiments. In particular, if one experiment is active, one or more other of the experiments will be more likely to also be active.

Layers allow for independence between experiment assignments. For example, each 50% experiment can be assigned within its own layer. If two 50% experiments, Experiment A and Experiment B, are in different layers, it is guaranteed that their simultaneous activation is completely independent because the probability of A and B running simultaneously equals the probability of A running times the probability of B running. $P(Exp\_A \& Exp\_B)=P(Exp\_A)*P(Exp\_B)$. If two experiments are in the same layer and do not overlap, it is guaranteed that $P(Exp\_A \& Exp\_B)=0$. If the experiments overlap, they will be activated simultaneously depending on the degree of overlap.

In block 210, the software module 110 of the server 105 detects an event that triggers experiment assignment. For example, an event can include a user of a client device 120 loading a speech application 125 on the client device 120, a user submitting a query via the client device 120, or another action taken by or with the client device 120. Generally, the server 105 detects the event by receiving a request or other information from the client device 120. For example, the server 105 may receive a request from the client device 120 to activate an applicable speech application 125.

Figure 3:
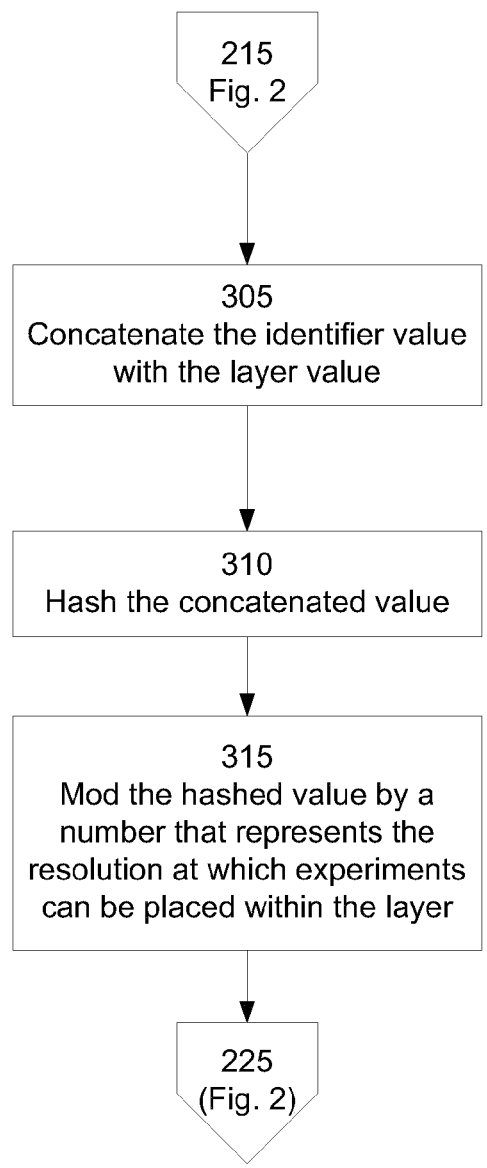
FIG. 3 is a flow chart depicting a method for calculating a location based on an identifier value, in accordance with certain exemplary embodiments.

In block 215, the software module 110 reads an identifier value (such as an installation identifier value) associated with the detected event. For example, the software module 110 can read the value from the request received in connection with the detected event. In block 220, the software module 110 calculates, for each layer associated with the identifier, a location within the layer based on the identifier value. FIG. 3 is a block flow diagram depicting a method 220 for calculating the location, in accordance with certain exemplary embodiments. The method 220 is described below with reference to FIGS. 1-3.

In block 305, the software module 110 of the server 105 concatenates the identifier value with the layer identifier. For example, if the identifier value is "12345" and the layer identifier is 54, the concatenated value would be "12345-54". In block 310 the software module 110 hashes the concatenated value. As would be readily understood by a person of ordinary skill in the art having the benefit of the present disclosure, hashing involves converting a larger amount of data, such as a text value, into a small datum, such as an integer. For example, the concatenated value 12345-54 can be hashed into the integer 5539392.

In block 315, the software module 110 mods the hashed value by a number that represents the resolution at which experiments can be placed within the layer. For example, if the mod value is 1000, experiments can be specified with a resolution of 0.1%. Assuming a mod value of 1000, the final location for the identifier "12345" in layer 54 will be: 5539392 mod 1000=392 or 39.2%. Upon calculating the location, the method 220 ends and the method 200 continues to block 225 of FIG. 2.

In block 225, the software module 110 identifies each experiment that overlaps with the calculated location within each applicable layer, based on the information in the experiment configuration file 115. For example, the experiment configuration file 115 might identify experiment locations and sizes within a particular layer as follows:

|XXXX-----------| Exp_A (25%)
|--------XXXX----| Exp_B (25%)
| 1 2 3 |

In this layer, there are two experiments. The experiments are specified as:

Exp_A: layer 1, offset 0%, size 25%
Exp_B: layer 1, offset 25%, size 25%

Identifier 1, with mod value 12%, is in Exp_A. Identifier 2, with mod value 32%, is in Exp_B. Identifier 3, with mod value 63%, is in neither.

In certain exemplary embodiments, each experiment is associated with one or more sets of parameters to be used on each client device or server. In certain exemplary embodiments, each experiment includes software parameters for use in connection with the event detected in block 210. For example, each experiment can be associated with different parameters to be used for a search query, session, or installation. The parameters may be specified in a serialization format, such as the protocol buffer format developed by Google Inc. For example, the protocol buffers can include fields that control client device 120 or server 105 behavior. Typically, the parameters are grouped into sets of settings for each specific client device 120 or server 105. One advantage of using parameter sets rather than raw experiment identifiers to control application logic is that the additional layer of indirection allows for experiments that affect multiple different parameters simultaneously. Another advantage is that parameters associated with a specific experiment may be altered without having to push a new client binary.

In block 230, the software module 110, determines whether, for each experiment identified in block 225, any changes should be made to the parameters for the experiment, prior to activating the experiment. In certain exemplary embodiments, the experiment configuration file identifies overrides, which associate with each experiment identifier a specific change that should be made to parameters if the experiment is active. Each override includes a filter, which specifies the experiment identifiers for which the override is active and a set of conditions for activating the override. In certain exemplary embodiments, the conditions may include experiment identifiers, client-side features, and/or server-side features. For example, a filter may require a particular experiment or set of experiments to be active, certain platform, device type, operating system version, client version, locale, country, and/or other characteristics on the client side, and/or certain datacenter location, server version number, and/or other characteristics on the server side.

The overrides may be executed in the order they appear in the configuration file. For example, the software module 110 can start with a default parameter set and for each override, if the applicable conditions in the filter are satisfied, the software module can modify the parameter set accordingly.

For example, the default parameter set might be:
{
double sample_rate=8000;
int channels=1;
}
The override list might be:
{
(EXP_16 KHZ, {double sample_rate=16000;})
}
If experiment EXP_16 KHZ is active, the resulting parameter set will be:
{
double sample_rate=16000;
int channels=1;
}

If the software module 110 determines in block 230 that any changes should be made to the parameters for the experiment prior to activating the experiment, the software module 110 assigns and deploys the experiment in block 240 using a modified parameter set, as set forth above. If the software module 110 determines in block 230 that no parameter changes are required, the software module 110 assigns and deploys the experiment using the default parameter set in block 235.

In certain exemplary embodiments, the method 200 is used to reconfigure existing parameter sets on a client device 120. For example, a client device 120 can include a locally cached parameter set. When the client device 120 initiates a session with the server 105, it can send the server 105 a hash code of its current parameter set. The server 105 can use its experiment configuration, and values sent from the client 120 (such as installation identifier, session, identifier, and/or utterance identifier) to compute a parameter set that applies to the installation and session, substantially as described above. The server 105 can compare the hash code of the new parameter set with the hash code sent by the client 120. If the hash codes are different, the server 105 can send the client 120 a new parameter set, which the client 120 can store in its cache and start using. If parameters are transmitted to the client 120 at the start of a speech session or utterance, for example, changes made to the experiment configuration can be reflected in the behavior of the client device 120 almost immediately. This allows for rapid enabling or disabling of experiments, quick adjustments to the size of each experiment (i.e., the percentage of client devices for which the experiment is activated), or gradual rolling out of new features. For example, the size of the experiment can increase as the experiment development progresses.

Although described herein as being performed by a software module 110 of the server 105, in certain alternative exemplary embodiments, some or all of the blocks of the method 200 may be performed on the client side. For example, the server 105 can send the client device 120 the complete experiment configuration file, and then the client device 120 can interpret the file and follow the blocks outlined in FIGS. 2 and 3 to modify parameters associated with one or more applicable experiments.

General

The exemplary methods and blocks described in the embodiments presented previously are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein.

The invention can be used with computer hardware and software that performs the methods and processing functions described above. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the invention have been described above in detail, the description is merely for purposes of illustration. Various modifications of, and equivalent blocks corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

What is claimed is:

1. A computer-implemented method comprising:
   obtaining organizational information related to client-side experiments that are available for deployment on client devices, the organizational information mapping event identifiers to client-side experiments;
   detecting, by a server, a value of an event identifier associated with a trigger event, the trigger event comprising an action taken by a client device;
   identifying one or more corresponding client-side experiments that are to be activated at the client device by comparing the event identifier to the organizational information; and
   causing, by the server, the identified corresponding client-side experiments to be activated at the client device.

2. The method of claim 1, wherein identifying one or more corresponding client-side experiments comprises:
   calculating a concatenated value by concatenating the value of the event identifier;
   calculating a hash value by hashing the concatenated value;
   calculating a mod value based on the hash value; and
   matching the calculated mod value to the organizational information to determine the client-side experiments that are to be activated.

3. The method of claim 1, further comprising:
   for each identified client-side experiment, selecting a parameter set based on at least one condition;
   wherein activating each identified client-side experiment causes the identified client-side experiment to be activated on the client device using the selected parameter set.

4. The method of claim 3, wherein the parameter set is chosen to be a default parameter set or a modified parameter set, and the at least one condition comprises a characteristic of the client device.

5. The method of claim 1, wherein the event that triggers receiving a value of the event identifier comprises the loading of a speech application on the client device.

6. The method of claim 1, wherein the event that triggers receiving a value of the event identifier comprises the submission of a search query via the client device.

7. The method of claim 1, wherein the event that triggers receiving a value of the event identifier comprises the installation of a software application on the client device.

8. The method of claim 1, wherein the organizational information comprises information about a universe of possible values for the event identifiers, each client-side experiment being associated with one or more of the possible values, and wherein the identifying comprises matching the value of the identifier associated with the trigger event with a possible value in the universe of possible values and identifying the client-side experiments that are associated with that possible value.

9. A system comprising:
   one or more computers and one or more storage devices storing instructions that are operable, when executed by the one or more computers, to cause the one or more computers to perform operations comprising:
      obtaining organizational information related to client-side experiments that are available for deployment on client devices, the organizational information mapping event identifiers to client-side experiments;
      detecting, by the one or more computers, a value of an event identifier associated with a trigger event, the trigger event comprising an action taken by a client device;
      identifying one or more corresponding client-side experiments that are to be activated at the client device by comparing the event identifier to the organizational information; and
      causing, by the one or more computers, the identified corresponding client-side experiments to be activated at the client device.

10. The system of claim 9, wherein identifying one or more corresponding client-side experiments comprises:
    calculating a concatenated value by concatenating the value of the event identifier;
    calculating a hash value by hashing the concatenated value;
    calculating a mod value based on the hash value; and
    matching the calculated mod value to the organizational information to determine the client-side experiments that are to be activated.

11. The system of claim 9, wherein the operations further comprise:
    for each identified client-side experiment, selecting a parameter set based on at least one condition;
    wherein activating each identified client-side experiment causes the identified client-side experiment to be activated on the client device using the selected parameter set.

12. The system of claim 11, wherein the parameter set is chosen to be a default parameter set or a modified parameter set, and the at least one condition comprises a characteristic of the client device.

13. The system of claim 9, wherein the event that triggers receiving a value of the event identifier comprises the loading of a speech application on the client device.

14. The system of claim 9, wherein the event that triggers receiving a value of the event identifier comprises the submission of a search query via the client device.

15. The system of claim 9, wherein the event that triggers receiving a value of the event identifier comprises the installation of a software application on the client device.

16. The system of claim 9, wherein the organizational information comprises information about a universe of possible values for the event identifiers, each client-side experiment being associated with one or more of the possible values, and wherein the identifying comprises matching the value of the identifier associated with the trigger event with a possible value in the universe of possible values and identifying the client-side experiments that are associated with that possible value.

17. A non-transitory computer-readable storage device storing software comprising instructions executable by one or more computers which, upon such execution, cause the one or more computers to perform operations comprising:
   obtaining organizational information related to client-side experiments that are available for deployment on client devices, the organizational information mapping event identifiers to client-side experiments;
   detecting, by a server, a value of an event identifier associated with a trigger event, the trigger event comprising an action taken by a client device;
   identifying one or more corresponding client-side experiments that are to be activated at the client device by comparing the event identifier to the organizational information; and
   causing, by the server, the identified corresponding client-side experiments to be activated at the client device.

18. The computer-readable storage device of claim 17, wherein identifying one or more corresponding client-side experiments comprises:
   calculating a concatenated value by concatenating the value of the event identifier;
   calculating a hash value by hashing the concatenated value;
   calculating a mod value based on the hash value; and
   matching the calculated mod value to the organizational information to determine the client-side experiments that are to be activated.

19. The computer-readable storage device of claim 17, wherein the operations further comprise:
   for each identified client-side experiment, selecting a parameter set based on at least one condition;
   wherein activating each identified client-side experiment causes the identified client-side experiment to be activated on the client device using the selected parameter set.

20. The computer-readable storage device of claim 19, wherein the parameter set is chosen to be a default parameter set or a modified parameter set, and the at least one condition comprises a characteristic of the client device.

\* \* \* \* \*